(12) United States Patent
Shoji et al.

(10) Patent No.: US 7,804,883 B2
(45) Date of Patent: Sep. 28, 2010

(54) METHOD AND SYSTEM FOR FREQUENCY HOPPING RADIO COMMUNICATION

(75) Inventors: Yozo Shoji, Tokyo (JP); Hiroyo Ogawa, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 853 days.

(21) Appl. No.: 10/525,966

(22) PCT Filed: Sep. 12, 2002

(86) PCT No.: PCT/JP02/09327

§ 371 (c)(1),
(2), (4) Date: Feb. 28, 2005

(87) PCT Pub. No.: WO2004/025863

PCT Pub. Date: Mar. 25, 2004

(65) Prior Publication Data

US 2005/0249265 A1 Nov. 10, 2005

(51) Int. Cl.
*H04B 1/69* (2006.01)
(52) U.S. Cl. .................. 375/133; 375/130; 375/132; 375/134; 375/135; 375/136; 375/137
(58) Field of Classification Search .............. 375/132, 375/133, 135, 136
See application file for complete search history.

(56) References Cited

U.S. PATENT DOCUMENTS

| | | | |
|---|---|---|---|
| 5,355,523 A | | 10/1994 | Ogawa et al. |
| 5,400,359 A | * | 3/1995 | Hikoso et al. ............ 375/133 |
| 5,506,863 A | * | 4/1996 | Meidan et al. ............ 375/134 |

(Continued)

FOREIGN PATENT DOCUMENTS

JP   2000-013342   1/2000

(Continued)

OTHER PUBLICATIONS

Partial Supplementary European Search Report issued in corresponding European Patent Application No. 02763020.1, on Aug. 6, 2007.

(Continued)

*Primary Examiner*—David C Payne
*Assistant Examiner*—Leon Flores

(57) ABSTRACT

A transmitter shown in FIG. 3 inputs to a mixer 36 an IF band modulation signal generated from transmission data and a frequency hopping signal obtained by a hopping synthesizer 38 controlled by a hopping pattern generator 37, thereby obtaining a frequency hopping radio signal to be transmitted. In a receiver shown in FIG. 4, a received signal is amplified and an unnecessary wave is removed from the signal, and the resultant signal is input to a mixer 44. The mixer 44 receives an output signal of a hopping synthesizer 47 controlled by a signal obtained by adding a fixed frequency offset signal to the hopping pattern generator 45. A signal downconverted to a first IF band without frequency hopping corresponding to the offset signal with a radio frequency band signal maintaining the relative spectrum relationship appears in the output of the mixer 44. An unnecessary wave of the signal is removed, a square unit 49 performs square detection, and a modulation signal in the intermediate frequency band used by the source is regenerated. The obtained IF band signal is modulated, thereby receiving desired data.

8 Claims, 4 Drawing Sheets

U.S. PATENT DOCUMENTS

| | | | |
|---|---|---|---|
| 5,625,641 A | | 4/1997 | Takakusaki |
| 5,970,055 A | | 10/1999 | Park et al. |
| 5,970,400 A | * | 10/1999 | Dwyer ........................ 455/254 |
| 6,130,905 A | * | 10/2000 | Wakayama .................. 375/132 |
| 6,459,704 B1 | * | 10/2002 | Jandrell ....................... 370/445 |

FOREIGN PATENT DOCUMENTS

| | | |
|---|---|---|
| JP | 2000-332678 | 11/2000 |
| WO | 95/06377 | 3/1995 |

OTHER PUBLICATIONS

Yozo Shoji et al. "Proposal of Millimeter-wave Self-heterodyne Communication System," Technical report of IEICE, RCS2000-30, pp. 1-8, Date:Jun. 29, 2000.

Yozo Shoji et al. "Millimeter-wave Self heterodyne Communication Systems using Double-Side-Band Signal Transmission," Proceedings of the 2001 Communications Society Conference of IEICE, B-5-225, p. 511, Date: Aug. 29, 2001.

Yozo Shoji et al. "Millimeter-Wave Ad Hoc Wireless Access System- (1) Overview of System Development," Proceedings of the 2002 IEICE General Conference, B-5-332, p. 783 Date : Mar. 7, 2002.

Yozo Shoji et al. "Millimeter-Wave Ad Hoc Wireless Access System- (3) Multicarrier synchronized hopping—" Proceedings of the 2002 IEICE General Conference, B-5-334, p. 785, Date: Mar. 7, 2002.

Yozo Shoji et al. "Millimeter-Wave Ad Hoc Wireless Access System- (4) RF Front-End Modules Using IF Self-Heterodyne Scheme-" Proceedings of the 2002 IEICE General Conference, B-5-335, p. 786, Date: Mar. 7, 2002.

Supplementary European Search Report, mailed Oct. 17, 2007 and issued in corresponding European Patent Application No. 02763020. 1-1525.

* cited by examiner

METHOD AND SYSTEM FOR FREQUENCY HOPPING RADIO COMMUNICATION

TECHNICAL FIELD

The present invention relates to a frequency hopping wireless communication method and system for performing wireless communication to which a frequency hopping system is applied in an area of a high frequency such as a milliwave band, etc.

BACKGROUND ART

When a wireless communication system for use in a frequency band requiring no license, it is effective to implement a frequency hopping system as means for avoiding or sufficiently suppressing the effect of a narrow-band interference.

FIGS. 6 and 7 show the configurations of the transmitter and the receiver of a wireless communication system when a common frequency hopping system is used. The transmitter obtains a frequency hopping radio modulation signal by inputting to a mixer 4 a signal obtained from an intermediate frequency (IF) band modulator 1 for receiving transmission data and an output of a hopping synthesizer 3 controlled by a signal from a hopping pattern generator 2. An unnecessary wave component is removed from the signal by a band pass filter 5, and a resultant signal is transmitted from a transmitting antenna 6. In the receiver, after a received signal is received by a receiving antenna 7 and amplified by an amplifier 8, an unnecessary wave component is removed by a wide band pass filter 9, the resultant signal and an output signal of a hopping synthesizer 12 controlled by a hopping pattern generator 11 for generating a frequency hopping pattern corresponding to a desired received signal are input to a mixer 10, the signals pass through a band pass filter 13, and a non-hopping fixed IF frequency modulation signal is obtained. The signal is input to an IF band demodulator 14, and the data is demodulated. FIG. 7 shows the configuration for capturing the synchronization of a hopping frequency in the receiver. That is, the output of the band pass filter 13 further passes through a signal detector (envelope detector) 15 and an integrator 16, and is compared with a threshold level and input to a phase controller 18, and the output controls the generated phase of the hopping synthesizer 12.

In this case, to maintain the quality of the transmitted signal, and to obtain a substantial interference suppression effect by a frequency hopping, it is necessary to maintain a predetermined frequency difference between the output of the hopping synthesizer used in a transmitter and the output of the hopping synthesizer used in a receiver, and to maintain small time fluctuation for a phase difference. Therefore, it is necessary that the hopping synthesizer to be used in a transmitter and a receiver is stable in frequency, has low phase noise, and is highly responsive. Especially, in a high-frequency microwave area, various methods for stabilization, lower noise, etc. using a dielectric oscillator or a PLL (phase lock loop) are devised.

However, as the frequency becomes higher (for example, a milliwave band of 30 GHz or more), it is more difficult to realize a frequency-stable and low phase noise hopping synthesizer, and the production cost rises. Furthermore, when a modulation signal to be transmitted is a multicarrier signal which is a narrow-band modulation signal or an OFDM (orthogonal frequency division multiplexing) signal, it is necessary that the hopping synthesizer between a transmitter and a receiver has a synchronous frequency with high precision. Additionally, since the frequency changes at a burst, a responsive countermeasure is required. However, it is very hard to operate in, for example, a high frequency such as a milliwave band a hopping synthesizer capable of synchronize a frequency with high precision, and it is also very difficult to immediately take action against an occurrence of a large frequency offset or synchronously supplement it, thereby requiring an expensive system stabilizing mechanism.

DISCLOSURE OF THE INVENTION

The present invention has been developed to solve the above-mentioned problems, and aims at configuring a wireless system in a frequency hopping system free of the effect of a local oscillator for a frequency conversion or the unstable frequency of a hopping synthesizer.

The present invention also aims at realizing a small and low-cost and system capable of applying without a highly stable local oscillator or hopping synthesizer a frequency hopping system in a very high frequency area such as a milliwave band in which the frequency hopping system has conventionally been very difficult.

The frequency hopping wireless communication method and system according to the present invention performs communications between a plurality of wireless communication terminals each including: a transmitting unit for generating a radio modulation signal by multiplying an intermediate frequency band modulation signal from an intermediate frequency band modem by a local oscillation signal; and a receiving unit for generating an intermediate frequency band demodulation signal downconverted by multiplying a radio modulation signal by a local oscillation signal, and demodulating the signal in the intermediate frequency band modem. A transmitting station for transmitting only a reference local oscillation signal is provided, or one of the plurality of wireless communication terminals acts as a base station or a parent station and transmits a local oscillation signal for use in the station together with a radio modulation signal. Each of the plurality of wireless communication terminals modulates a transmission signal in the frequency hopping system using the intermediate frequency band modem, and demodulates a received signal. Furthermore, each of the plurality of wireless communication terminals receives a reference local oscillation signal from the transmitting station, amplifies and band filters the signal, regenerates a reference local oscillation signal by an injection synchronous oscillator or an amplifier, and mutually performs communications using the signal as a local oscillation signal for use by a transmitting function and a receiving function.

According to the present invention, in each of the plurality of wireless communication terminals, the transmitting unit upconverts a modulation signal generated in an intermediate frequency band to a radio frequency band using a local oscillation signal functioning as a hopping synthesizer, and simultaneously transmits a frequency hopping radio modulation signal of a single-side band wave or a both-side band wave obtained by the upconversion and the local oscillation signal used in the upconversion. The receiving unit downconverts a received signal to a first intermediate frequency band signal using a local oscillation signal frequency hopping in a pattern obtained by adding a fixed frequency offset to a frequency hopping pattern corresponding to a desired reception wave, and then extracts two signal components, that is, a local oscillation signal component and a modulation signal component, by passing the downconverted signal through a band pass filter, and generates a product component of the two signal components, thereby regenerating a second intermediate frequency band modulation signal.

BEST MODE FOR CARRYING OUT THE INVENTION

First Embodiment

Figure 1:
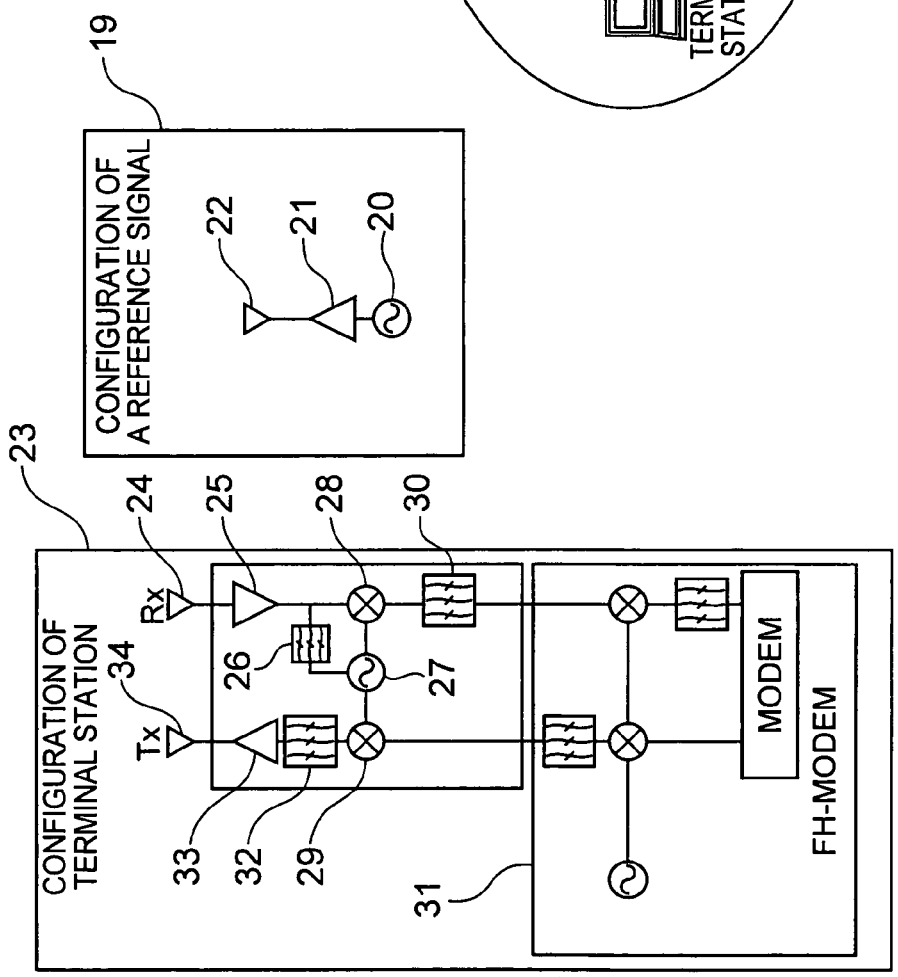
FIG. 1 shows the first embodiment of the present invention.
Figure 2:
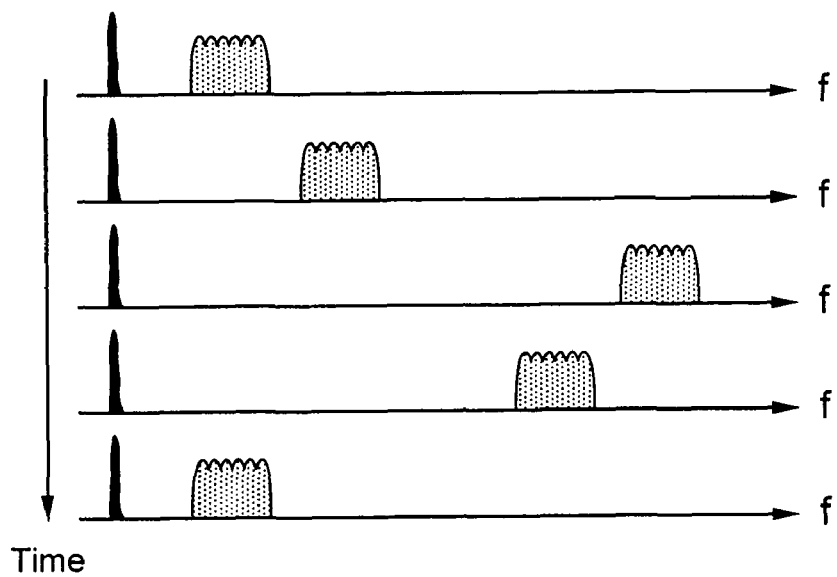
FIG. 2 shows a spectrum transmitted/regenerated according to the first embodiment.

FIG. 1 shows the configuration of the wireless communication system according to the first embodiment of the present invention. FIG. 2 shows the transition os a signal spectrum transmitted and received by each station. As shown in FIG. 1C, the system comprises one reference signal station 19 and a plurality of terminal stations 23. As shown in FIG. 1B, the reference signal station 19 amplifies the reference local oscillation signal generated by a reference station local oscillator 20 using an amplifier 21, and then transmits the signal from an antenna 22. As shown in FIG. 1A, each terminal station 23 receives it using a receiving antenna 24. The received signal is amplified by an amplifier 25, a part of the resultant signal is branched, a band pass filter 26 removes an unnecessary wave, and the resultant signal is input to the synchronous oscillator or an amplifier 27. As a result, a local oscillation signal synchronous with the reference local oscillation signal output by the reference signal station 19 is obtained. The terminal station 23 branches the obtained local oscillation signal into two, inputs one to a receiving frequency converter (mixer) 28, and the other to a transmitting frequency converter (mixer) 29. The mixers 28 and 29 of the terminal station 23 are connected an intermediate frequency (IF) band modem circuit 31 in the FH system for demodulating and generating a signal in the frequency hopping system (FH). An unnecessary wave component of an IF band FH modulation signal output by the mixer 28 is removed by a band pass filter 30, and then the signal is input to the intermediate frequency (IF) band modem circuit 31 in the FH system, thereby obtaining desired data. Meanwhile, the IF band FH modulation signal obtained by the intermediate frequency (IF) band modem circuit 31 is input to the mixer 29, and frequency-converted to a radio frequency band. After an unnecessary wave is removed by a band pass filter 32, an amplifier 33 amplifies the signal, and transmits it through a transmitting antenna 34.

Figure 6:
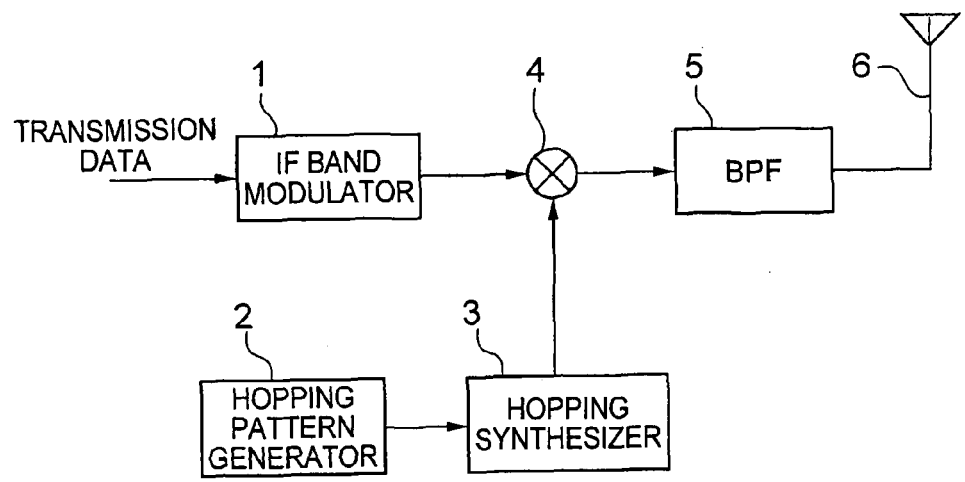
FIG. 6 shows the configuration of the transmitter in the conventional frequency hopping system.
Figure 7:
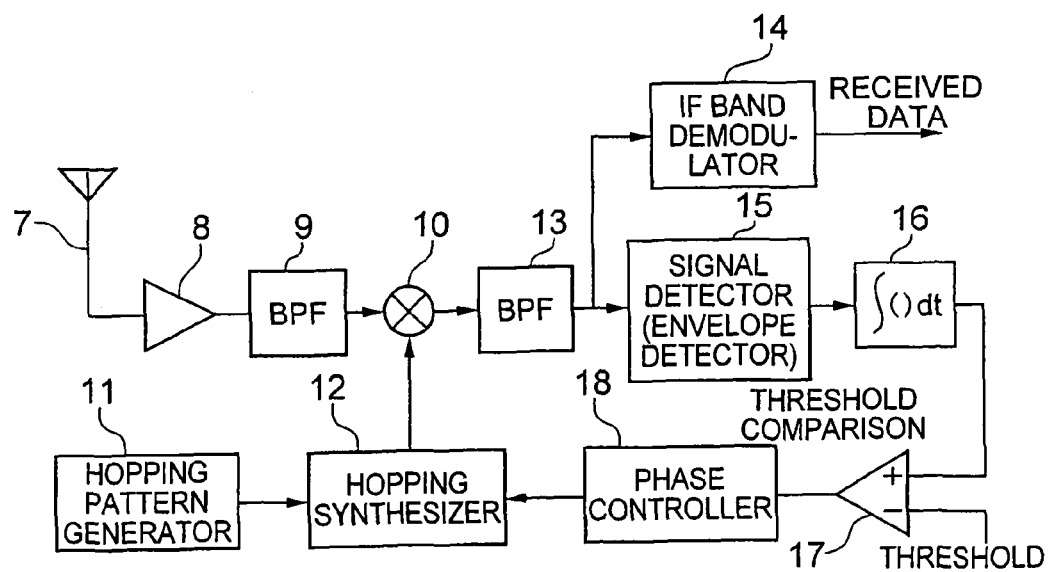
FIG. 7 shows the configuration of the receiver in the conventional frequency hopping system.

The configuration of the transmitter/receiver included in the IF band modem circuit 31 in the FH system is the same as that of the conventional frequency hopping system shown in FIGS. 6 and 7. According to the first embodiment, the frequency offset and phase noise occurring in a radio signal are sufficiently removed by the circuit before it is input to the intermediate frequency (IF) band modem circuit 31 in the FH system. Therefore, since the intermediate frequency (IF) band modem circuit 31 in the FH system does not have to be highly responsive or to excel in synchronous supplement, the conventional frequency hopping system can be used.

FIG. 2 shows the transition a signal spectrum in time transmitted and received according to the first embodiment of the present invention. While the frequency of a spectrum (deep black portion) issued from the reference signal station 19 does not change with time, a radio modulation signal (pale black portion) upconverted and transmitted using the reference local oscillation signal indicates frequency hopping with time.

According to the first embodiment, a station for transmitting only a reference local oscillation signal is provided in addition to a terminal. With the configuration, in a system in which the transmitting power in aerial wire is limited for each transmitting station, more transmitting power can be assigned to a reference local oscillation signal, thereby successfully extending the communication area.

However, a reference local oscillation signal transmitting station can have the function of a terminal or the function of transmitting and receiving a signal. That is, one of the terminal group acts as a parent station, transmits to space a local oscillation signal used by the station as a reference local oscillation signal, and each of the other wireless terminals receives the reference oscillation signal, amplifies and band filters the signal, regenerates a local oscillation signal synchronous with the reference local oscillation signal at an appropriate level by the injection synchronous oscillator, and defines it as a local oscillation signal for frequency conversion used in the transmitting and receiving function.

In any case, according to the first embodiment, the configuration for transmitting a reference local oscillation signal has the merit of being free of the effect of an unstable frequency of a local oscillator for frequency conversion, thereby successfully configuring a wireless system of the frequency hopping system without an effect of unstable frequency of a local oscillator for frequency conversion.

Second Embodiment

Figure 3:
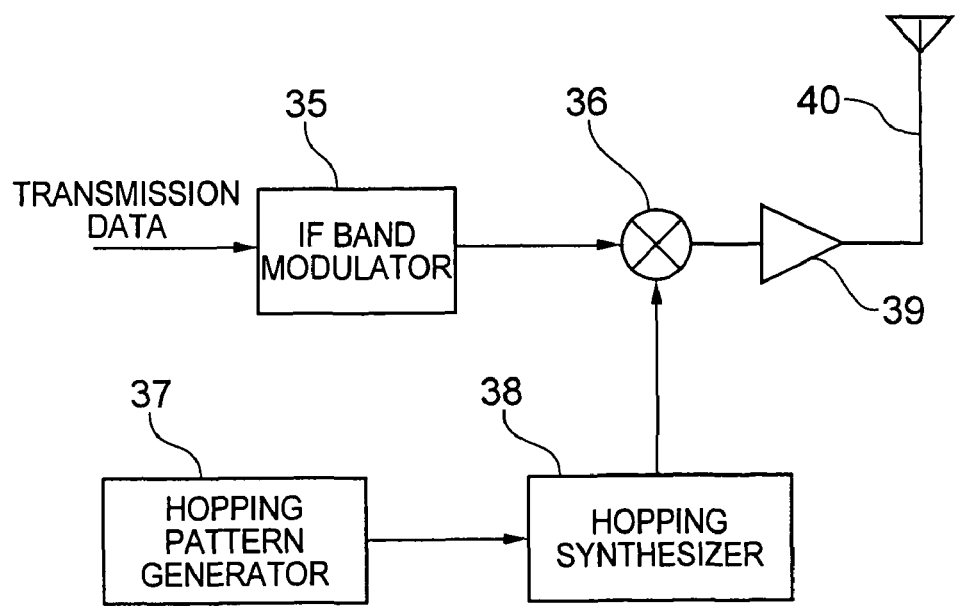
FIG. 3 shows the configuration of the transmitter according to the second embodiment.
Figure 4:
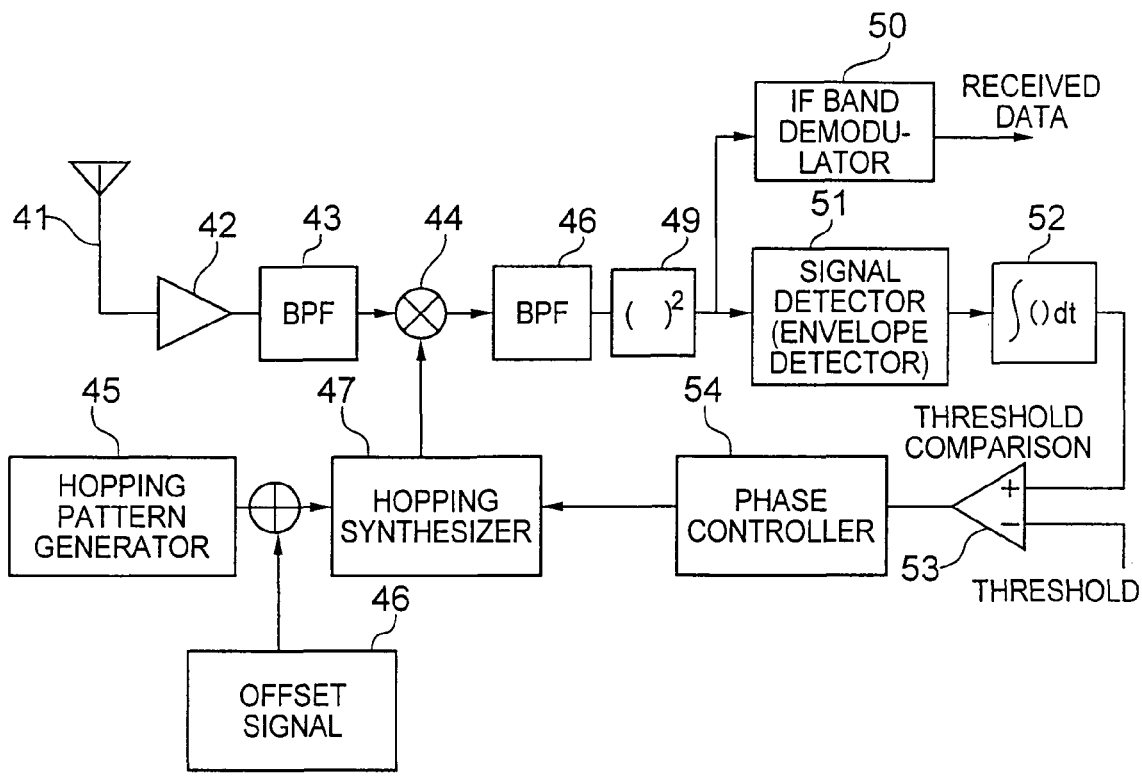
FIG. 4 shows the configuration of the receiver according to the second embodiment.
Figure 5:
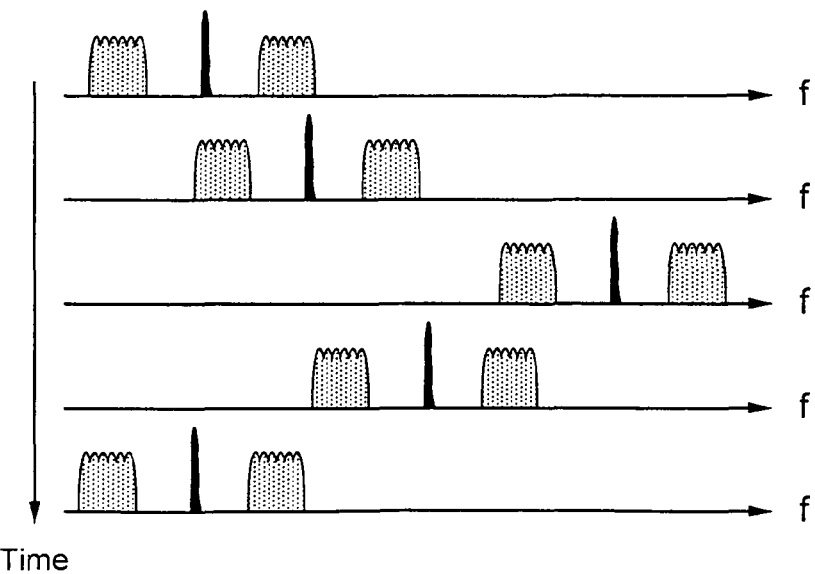
FIG. 5 shows the spectrum transmitted/received according to the second embodiment.

FIGS. 3 and 4 show the configuration of a transmitter and the configuration of a receiver of the wireless communication system according to the second embodiment of the present invention. FIG. 5 shows the transition of the spectrum of a signal transmitted and received between terminals. The present invention can be applied to the communications between a plurality of wireless terminals, and each wireless terminal comprises a transmitting unit as shown in FIG. 3 and a receiving unit as shown in FIG. 4, thereby performing bi-directional communications.

The transmitter shown in FIG. 3 generates an IF band modulation signal using an IF band modulator 35 and inputs an FH signal obtained by a hopping synthesizer 38 controlled by a hopping pattern generator 37 and the IF band modulation signal to a mixer 36, thus obtains a frequency hopping radio signal. The output includes an output signal of a hopping synthesizer used as a local oscillation signal in addition to the radio signal of a both-side band wave whose frequency is converted as shown in FIG. 5. These signals are amplified by an amplifier 39, and transmitted through an antenna 40.

According to the present embodiment, when a both-side band wave signal and a local oscillation signal are transmitted as outputs of a mixer in the present embodiment, etc., nothing to be removed by a band pass filter basically occurs. Therefore, as shown in FIG. 3, the band pass filter is not necessary after the frequency conversion mixer as shown in FIG. 3, thereby realizing a low-cost transmitter configuration.

Using an image rejecting mixer, a frequency-converted radio signal of a single-side band wave and an output signal of a hopping synthesizer used as a local oscillation signal can also be obtained.

In a receiver, a signal received by a receiving antenna 41 is amplified by an amplifier 42, an unnecessary wave of the signal is removed by a band pass filter 43, and the resultant signal is input to a mixer 44. Furthermore, the mixer 44 receives an output signal of a hopping synthesizer 47 controlled by a signal obtained by adding to a hopping pattern generator 45 a fixed frequency offset signal by an offset signal generator 46. As a result, a signal downconverted to a first IF band without frequency hopping corresponding to the offset signal with a radio frequency band signal maintaining the relative spectrum relationship appears in the output of the mixer 44. An unnecessary wave of the signal is removed by a band pass filter 48, a square unit 49 performs square detection, and a modulation signal in the intermediate frequency band used by the source is regenerated. In this signal, no frequency offset or degradation of phase noise occur in principle when upconversion and downconversion to a milliwave band in the FH system are performed because the original local oscillation signal component before the downconversion to the IF band and the radio modulation signal component, which are input to the square unit 49, have the same frequency offsets and phase noise components. Therefore, the obtained IF band signal is input to an IF band demodulator 50, and desired data can be received. FIG. 4 also shows the configuration for capturing synchronization of a hopping frequency in a receiver. That is, the output of the square unit 49 further passes through a signal detector (envelope detector) 51 and an integrator 52. The resultant signal is compared with a threshold level by a threshold comparator 53 and input to a phase controller 54. The output further controls the generated phase of the hopping synthesizer 47.

As described above, according to the second embodiment, a wireless system of the frequency hopping system without an effect of an unstable frequency of a hopping synthesizer can be configured.

INDUSTRIAL APPLICABILITY

According to the present invention, a wireless system of the frequency hopping system without an effect of a local oscillator for frequency conversion or an unstable frequency of a hopping synthesizer can be configured, thereby applying a frequency hopping system in a very high frequency area such as a milliwave band, etc. in which it has been conventionally hard to apply the system. Since it is not necessary to use a highly stable local oscillator or hopping synthesizer, a small and low-cost terminal and system can be realized.

The invention claimed is:

1. A frequency hopping wireless communication method for performing communications between a plurality of wireless communication terminals, each wireless communication terminal having a transmitting unit for generating a radio modulation signal by multiplying an intermediate frequency band modulation signal from an intermediate frequency band modem by a local oscillation signal, and a receiving unit for generating an intermediate frequency band demodulation signal downconverted by multiplying a radio modulation signal by a local oscillation signal, and demodulating the signal in the intermediate frequency band modem, the frequency hopping wireless communication method comprising:

transmitting a reference local oscillation signal from a transmitting station, the reference local oscillation signal being used for generating the intermediate frequency band demodulation signal downconverted by multiplying the radio modulation signal received in the receiving unit;

receiving the reference local oscillation signal from the transmitting station, amplifying and band filtering the received signal, regenerating the reference local oscillation signal by an injection synchronous oscillator or an amplifier in each of the wireless communication terminals;

modulating a transmission signal in a frequency hopping system using the regenerated reference local oscillation signal; and performing mutual communications using the transmission signal which is demodulated in each receiving wireless communication terminal of the plurality of wireless communication terminals using the regenerated reference local oscillation signal.

2. The frequency hopping wireless communication method according to claim 1, further comprising a dedicated transmitting station for transmitting only the reference local oscillation signal.

3. The frequency hopping wireless communication method according to claim 1, wherein one wireless communication terminal of the plurality of wireless communication terminals acts as a base station or a parent station, and transmits a local oscillation signal for use in the base station or the parent station together with a radio modulation signal, and each child station, which is any wireless communication terminal of the plurality of wireless communication terminals other than the one wireless communication terminal acting as the base station or the parent station, receives the reference local oscillation signal transmitted by the base station or the parent station.

4. A frequency hopping wireless communication method for performing communications between a plurality of wireless communication terminals each wireless communication terminal having a transmitting unit for generating a radio modulation signal by multiplying an intermediate frequency band modulation signal from an intermediate frequency band modem by a local oscillation signal, and a receiving unit for generating an intermediate frequency band demodulation signal downconverted by multiplying a radio modulation signal by a local oscillation signal, and demodulating the signal in the intermediate frequency band modem, the frequency hopping wireless communication method comprising:

upconverting a modulation signal generated in an intermediate frequency band to a radio frequency band using a local oscillation signal functioning as a hopping synthesizer by the transmitting unit in each of the plurality of wireless communication terminals, and simultaneously transmitting a frequency hopping radio modulation signal of a single-side band wave or a both-side band wave obtained by the upconverting, and the local oscillation signal used in the upconverting; and downconverting a received signal by the receiving unit to a first intermediate frequency band signal using a local oscillation signal frequency hopping in a pattern obtained by adding a fixed frequency offset to a frequency hopping pattern corresponding to a desired reception wave, and then extracting two signal components, a local oscillation signal component that is the local oscillation signal used in the upconverting the modulation signal, and a modulation signal component, by passing the downconverted signal through a band pass filter, and generating a product component of the two signal components, thereby regenerating a second intermediate frequency band modulation signal.

5. A frequency hopping wireless communication system comprising:
   a transmitting station for transmitting a reference local oscillation signal to be used by wireless communication terminals for generating a intermediate frequency band demodulation signal downconverted by multiplying a radio modulation signal received by the wireless communication terminals; and
   a plurality of wireless communication terminals, each wireless communication terminal having:
      a receiving unit that amplifies and band filters a signal received from the transmitting station to regenerate the reference local oscillation signal by an injection synchronous oscillator or an amplifier, and generates the intermediate frequency band demodulation signal downconverted by multiplying the received radio modulation signal by the reference oscillation signal, and demodulates the intermediate frequency band demodulation signal in the intermediate frequency band modem; and
      a transmitting unit that generates and transmits a radio modulation signal by multiplying an intermediate frequency band modulation signal from an intermediate frequency band modem by the reference local oscillation signal.

6. The frequency hopping wireless communication system according to claim 5, further comprising
   one transmitting station for transmitting only the reference local oscillation signal.

7. The frequency hopping wireless communication system according to claim 5, wherein
   one of the plurality of wireless communication terminals acts as a base station or a parent station and transmits a local oscillation signal for use in the station together with a radio modulation signal, and each child station which is any of the wireless communication terminals other than the one wireless communication terminal acting as the base station or the parent station, receives a reference local oscillation signal transmitted by the base station or the parent station.

8. A frequency hopping wireless communication system, comprising:
   a plurality of wireless communication terminals, each wireless communication terminal having
      a transmitting unit for generating a radio modulation signal by multiplying an intermediate frequency band modulation signal from an intermediate frequency band modem by a local oscillation signal, and
      a receiving unit for generating an intermediate frequency band demodulation signal downconverted by multiplying a radio modulation signal by a local oscillation signal, and demodulating the signal in the intermediate frequency band modem, wherein
   in each of the plurality of wireless communication terminals, the transmitting unit upconverts a modulation signal generated in an intermediate frequency band to a radio frequency band using a local oscillation signal functioning as a hopping synthesizer, and simultaneously transmits a frequency hopping radio modulation signal of a single-side band wave or a both-side band wave obtained by the upconversion and the local oscillation signal used in the upconversion; and
   the receiving unit downconverts a received signal to a first intermediate frequency band signal using a local oscillation signal frequency hopping in a pattern obtained by adding a fixed frequency offset to a frequency hopping pattern corresponding to a desired reception wave, and then extracts two signal components, that is, a local oscillation signal component that is the local oscillation signal used in the upconverting the modulation signal, and a modulation signal component, by passing the downconverted signal through a band pass filter, and generates a product component of the two signal components, thereby regenerating a second intermediate frequency band modulation signal.

* * * * *